(12) United States Patent
Ashida (10) Patent No.: US 7,617,008 B2
(45) Date of Patent: Nov. 10, 2009

(54) MANAGING METHOD FOR DETERMINING MASTER-SLAVE RELATIONSHIP IN INFORMATION PROCESSOR SYSTEM

(75) Inventor: Kazuhide Ashida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 11/459,790

(22) Filed: Jul. 25, 2006

(65) Prior Publication Data

US 2008/0028080 A1   Jan. 31, 2008

(51) Int. Cl.
   *G06F 15/16*   (2006.01)
(52) U.S. Cl. .......................... 700/3; 709/208
(58) Field of Classification Search ............... 700/3; 709/208–211
   See application file for complete search history.

(56) References Cited

U.S. PATENT DOCUMENTS

| | | | | |
|---|---|---|---|---|
| 5,920,695 | A * | 7/1999 | Hathorn et al. | 709/208 |
| 6,178,445 | B1 * | 1/2001 | Dawkins et al. | 709/209 |
| 6,192,397 | B1 * | 2/2001 | Thompson | 709/209 |
| 2003/0069979 | A1 | 4/2003 | Horiguchi | |

FOREIGN PATENT DOCUMENTS

| | | |
|---|---|---|
| CN | 1393085 A | 1/2003 |
| CN | 1671141 A | 9/2005 |
| GB | 1 567 314 | 5/1980 |
| JP | 2001-14889 | 1/2001 |

OTHER PUBLICATIONS

"USB On-The-Go Basics" Application Note 1822, Dec. 20. 2002, Http://pdfserv.maxim-ic.com/en/an/AN1822.pdf, pp. 1-4.
Lakshminarayanan, Subramanian et al., "An Architecture for Building Self-Configurable Systems", Department of Electrical Engineering and Computer Sciences, U.C. Berkeley, 2000 IEEE, pp. 63-73.

* cited by examiner

*Primary Examiner*—Ryan A Jarrett
(74) *Attorney, Agent, or Firm*—Oblon, Spivak, McClelland, Maier & Neustadt, L.L.P.

(57) ABSTRACT

A managing method is provided for an information processor system consisting of a plurality of information processors. In the system, each of the information processors has identification information containing a parameter for determining a master-slave relationship among the information processors and an algorithm for determining the master-slave relationship. When the information processors communicate with each other, an information processor exchanges its own identification information with the identification information of the other information processor and further makes a response of information processing on the basis of the identification information brought from the other information processor.

7 Claims, 10 Drawing Sheets

---

IDENTIFICATION INFORMATION (ID)

| |
|---|
| IDENTIFICATION INFORMATION FOR COMMUNICATION (COMMUNICATION ID) |
| TYPE INFORMATION |
| MASTER-SLAVE RELATIONSHIP DECISION INFORMATION |
| PRESENCE/ABSENCE OF MASTER DEVICE/SLAVE DEVICE |
| COMMUNICATION ID OF MASTER DEVICE/SLAVE DEVICE |

IDENTIFICATION INFORMATION (ID)

| IDENTIFICATION INFORMATION FOR COMMUNICATION (COMMUNICATION ID) |
|---|
| TYPE INFORMATION |
| MASTER-SLAVE RELATIONSHIP DECISION INFORMATION |
| PRESENCE/ABSENCE OF MASTER DEVICE/SLAVE DEVICE |
| COMMUNICATION ID OF MASTER DEVICE/SLAVE DEVICE |

FIG. 5

TYPE INFORMATION

| SYSTEM IDENTIFICATION |
|---|
| NETWORK IDENTIFICATION |
| IN-NETWORK IDENTIFICATION |
| UNIT IDENTIFICATION |
| SLOT IDENTIFICATION |
| MULTIPLEXING INFORMATION |
| SERIES IDENTIFICATION |
| CONTROLLER IDENTIFICATION |
| VERSION IDENTIFICATION |
| DATE OF MANUFACTURE |
| ... |
| ... |

FIG. 6

MASTER-SLAVE RELATIONSHIP DECISION INFORMATION

| LEVEL 1 | MAXIMUM CONSTITUENT NUMBER AT LEVEL 1 | MASTER INTENSITY | TOP LAYER |
|---|---|---|---|
| LEVEL 2 | MAXIMUM CONSTITUENT NUMBER AT LEVEL 2 | MASTER INTENSITY | |
| | | | |
| | | | |
| ... | ... | ... | |
| | | | |
| | | | |
| LEVEL m | MAXIMUM CONSTITUENT NUMBER AT LEVEL m | MASTER INTENSITY | BOTTOM LAYER |

FIG. 7

PRESENCE/ABSENCE OF MASTER DEVICE/SLAVE DEVICE

| LEVEL | PRESENCE/ABSENCE OF MASTER DEVICE | NUMBER OF SLAVE DEVICES |
|---|---|---|
| LEVEL 1 | — | — |
| LEVEL 2 | — | — |
|  |  |  |
| ... | ... | ... |
|  |  |  |
| LEVEL 15 | 1 | — |
| LEVEL 16 | 0 | 2 |
| LEVEL 17 | 0 | 3 |
| ... | ... |  |
| LEVEL m | 0 | 6 |

1 : PRESENCE OF MASTER DEVICE
0 : ABSENCE OF MASTER DEVICE

FIG. 8

COMMUNICATION ID OF MASTER DEVICE/SLAVE DEVICE

| LEVEL k | LEVEL l | LEVEL m | |
|---|---|---|---|
| COM. ID OF MASTER DEVICE IN GROUP k1 | COM. ID OF MASTER DEVICE IN GROUP l1 | COM. ID OF MASTER DEVICE IN GROUP m1 | COM. ID OF SLAVE UNIT IN GROUP m1 |
| | | | ⋮ |
| | | | COM. ID OF SLAVE UNIT IN GROUP m1 |
| | | COM. ID OF MASTER DEVICE IN GROUP m2 | COM. ID OF SLAVE UNIT IN GROUP m2 |
| | | | ⋮ |
| | | | COM. ID OF SLAVE UNIT IN GROUP m2 |
| | COM. ID OF MASTER DEVICE IN GROUP l2 | COM. ID OF MASTER DEVICE IN GROUP m3 | COM. ID OF SLAVE UNIT IN GROUP m3 |
| | | | ⋮ |
| | | | COM. ID OF SLAVE UNIT IN GROUP m3 |
| | | COM. ID OF MASTER DEVICE IN GROUP m4 | COM. ID OF SLAVE UNIT IN GROUP m4 |
| | | | ⋮ |
| | | | COM. ID OF SLAVE UNIT IN GROUP m4 |
| | | COM. ID OF MASTER DEVICE IN GROUP m5 | COM. ID OF SLAVE UNIT IN GROUP m5 |
| | | | ⋮ |
| | | | COM. ID OF SLAVE UNIT IN GROUP m5 |
| | COM. ID OF MASTER DEVICE IN GROUP l3 | COM. ID OF MASTER DEVICE IN GROUP m6 | COM. ID OF SLAVE UNIT IN GROUP m6 |
| | | | ⋮ |
| | | | COM. ID OF SLAVE UNIT IN GROUP m6 |

MASTER-SLAVE RELATIONSHIP DECISION INFORMATION (C1)

| | MAXIMUM CONSTITUENT NUMBER | MASTER INTENSITY |
|---|---|---|
| LEVEL 1 (TOP) (UNIT) | 1 | — |
| LEVEL 2 (BOX) | 4 | 1 (MINIMUM VALUE IN ALL BOXES) |
| LEVEL 3 (CARTON) | 6 | 1 (MINIMUM VALUE IN ALL CARTONS) |
| LEVEL 4 (CAN) | — | 1 (MINIMUM VALUE IN ALL CANS) |

FIG. 12B

MASTER-SLAVE RELATIONSHIP DECISION INFORMATION (C48)

| | MAXIMUM CONSTITUENT NUMBER | MASTER INTENSITY |
|---|---|---|
| LEVEL 1 (TOP) (UNIT) | 1 | — |
| LEVEL 2 (BOX) | 4 | 48 (MAXIMUM VALUE IN ALL BOXES) |
| LEVEL 3 (CARTON) | 6 | 48 (MAXIMUM VALUE IN ALL CARTONS) |
| LEVEL 4 (CAN) | — | 48 (MAXIMUM VALUE IN ALL CANS) |

FIG. 13

MANAGING METHOD FOR DETERMINING MASTER-SLAVE RELATIONSHIP IN INFORMATION PROCESSOR SYSTEM

BACKGROUND OF THE INVENTION

1. Field of the Invention

The present invention relates to a managing method for an information processor system that manages a plurality of information processors in groups on the basis of identification information owned by the respective information processors.

2. Description of the Related Art

In FA (Factory Automation) fields, which contains an assembly operation, such as a big steel plant, a paper making plant, and an automotive industry, PA (Plant Automation) fields such as a chemical plant, and industrial systems such as a water supply-sewerage system and other public systems, there has been widely adopted a control system using a plurality of control processors. In order that a monitor device can monitor the control processors, they are provided with identification information, respectively. Note below that the identification information will be referred to as "ID" and in plural form it will be referred to as "IDs".

Figure 1:
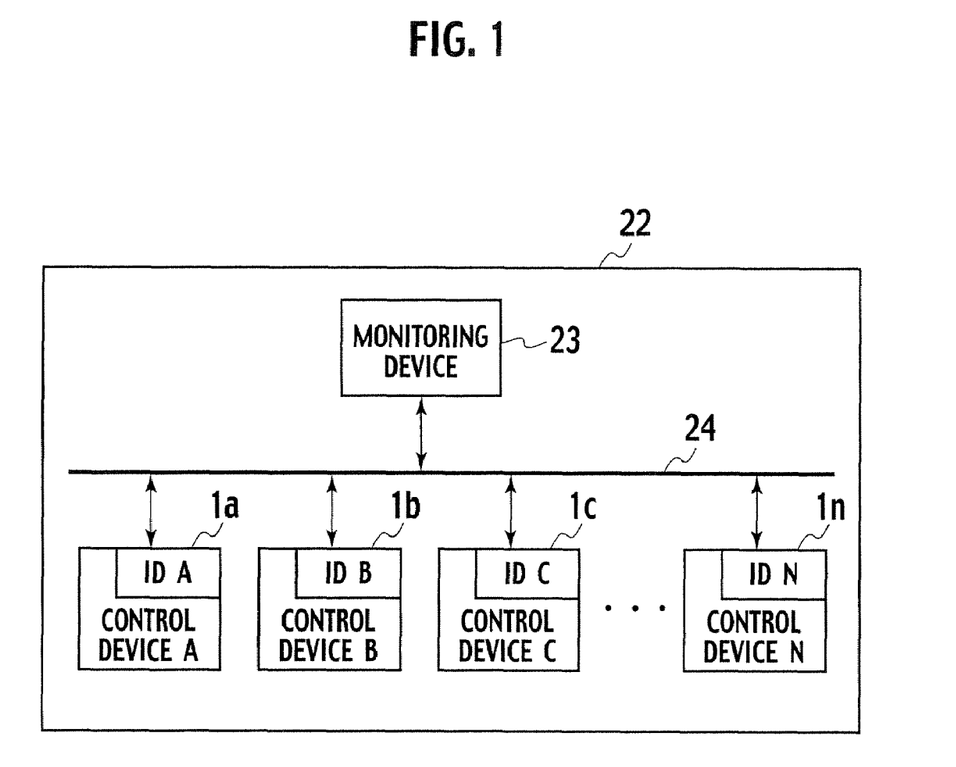
FIG. 1 is a structural view of a related art control system.

FIG. 1 is a structural view of such a control device system. This figure shows that a monitoring device 23 communicates with a plurality of control devices 1a~1n through a transmission line 24. In this control device system 22, the control devices 1a~1n have IDs, respectively. Accordingly, the monitor device 23 identifies the respective control devices 1a~1n with the use of respective IDs.

Such an ID-using method has a disadvantage that the monitor device 23 cannot grasp the whole constitution of the control device system unless the communication between the monitor device 23 and all of the control devices 1a~1n has been carried out completely. If the control devices 1a~1n are communicated with each other through a wired transmission line, it wouldn't be inconvenient so much to grasp the whole constitution of the control device system. However, if a wireless type transmission line connects the control devices 1a~1n are connected with each other through a wireless type transmission line, and additionally the structures of them are always variable, it is considerably inconvenient to grasp the whole constitution of the control device system.

Since the ID of the respective information processors (i.e. the control devices 1a~1n) has a simple function, the conventional information processor system has an issue that a higher-level information processor (i.e. the monitor device 23) cannot grasp the constitution of the whole system (i.e. all of lower-level information processors) unless the communication between the higher information processor and all of the lower-level information processors (i.e. the control devices 1a to 1n) has been completed.

Japanese Patent Application Laid-open No. 2001-14889 discloses a wireless information processor that improves both efficiency in wireless communication and workability of the whole system. In the wireless information processor, even if a plurality of wireless communication mediums enter into a communicable area simultaneously, it is possible to prevent them from responding simultaneously.

However, this wireless information processor does not manage the ID of an information processor in relation to the IDs of the other information processor.

SUMMARY OF THE INVENTION

In order to address the above issues, it is an object of the present invention to provide a managing method for an information processor system that manages a plurality of information processors without difficulty when they are communicated with each other.

The first aspect of the present invention provides a managing method for an information processor system including a plurality of information processors, comprising: allowing each of the information processors to possess an identification information containing a parameter for determining a master-slave relationship among the information processors and an algorithm for determining the master-slave relationship; allowing the information processors to exchange the identification information when the information processors communicate with each other; and allowing each of the information processors to make a response of information processing based on the identification information.

The second aspect of the present invention provides an information processor system comprising: a plurality of information processors connected with each other through a transmission line, each of the information processors having its own identification information containing a parameter for determining a master-slave relationship among the information processors and an algorithm for determining the master-slave relationship, wherein at least two information processors are communicated, the two information processors exchange their identification information, and one of the two information processors determines the master-slave relationship between the two information processors based on the identification information brought from the other of the information processors and the own algorithm for determining the master-slave relationship.

DETAILED DESCRIPTION OF THE PREFERRED EMBODIMENT

Figure 2:
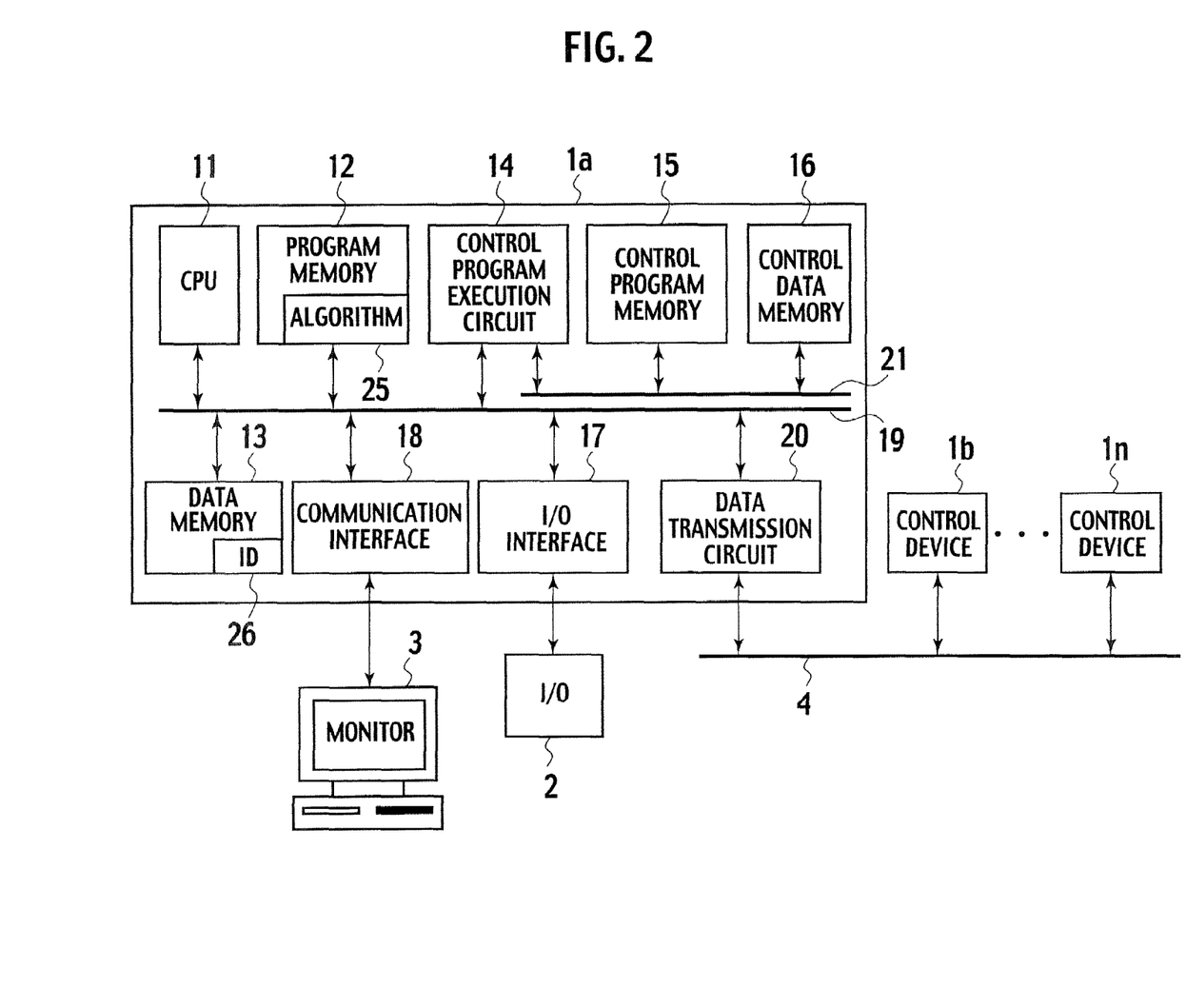
FIG. 2 is a detail view explaining the structure of a control device forming an information processor system to which a managing method for information processor system in accordance with an embodiment of the present invention is applied.

Referring to drawings, we now describe a managing method for information processor system in accordance with an embodiment of the present invention. FIG. 2 is a detail view explaining the structure of a control device forming an information processor system to which the managing method for information processor system in accordance with an embodiment of the present invention is applied. In FIG. 2, each control device corresponds to each information processor forming the information processor system of the present invention. Similarly, a control device system having a plurality of control devices corresponds to the information processor system of the present invention.

A plurality of control devices 1a~1n are connected with each other through a wireless transmission line 4, allowing a transmission of information among the control devices 1a~1n. Since the control devices 1a~1n have the same structures, respectively, we now describe only the structure of the control device 1a. The control device 1a comprises a CPU 11, a program memory 12, a data memory 13, a control program execution circuit 14, an I/O interface 17, a communication interface 18, and a data transmission circuit 20. They are connected to a system bus 19 in common. The control device 1a further comprises a control program memory 15 and a control data memory 16. They are connected to an exclusive bus 21 exclusive to the control program execution circuit 14.

An input/output module 2 is connected to the I/O interface 17 to perform inputting/outputting of data against an object to be controlled. A monitor 3 is connected to the communication interface 18. Note below that the input/output module 2 will be referred to as "I/O 2". The program memory 12 stores an algorithm 25 that determines a master-slave relationship among the control devices 1a~1n, and the data memory 13 stores identification information 26 that contains parameters determining the master-slave relationship among the control devices 1a~1n. Note below that the identification information 26 will be simply referred to as "ID 26".

The I/O interface 17 and the data transmission circuit 20 are constructed so as to be operable independently of the CPU 11 and the control program execution circuit 14.

The I/O interface 17 is provided to read out data of the object to be controlled from the I/O 2 and further output data for controlling the object. The CPU 11 and the control program execution circuit 14 read out I/O data from the I/O interface 17 and write the control data in the I/O interface 17, performing control operations. Similarly, the data transmission circuit 20 carries out a function as a network unit by exchanging transmission data with the control devices 1b~1n.

When the control devices 1a~1n are communicated with each other, they exchange the IDs 26 in the data memories 13 with each other. In the ID 26, as mentioned before, there is stored a parameter (first parameter) for determining the master-slave relationship among the control devices 1a~1n. Further, in each of the control devices 1a~1n, the program memory 12 includes an algorithm for determining the master-slave relationship among the control devices 1a~1n with the use of the first parameter.

The master-slave relationship among the control devices 1a~1n may be determined by adopting numerical values as the first parameter and further comparing their magnitude relation. Alternatively, as mentioned later, the master-slave relationship may be determined by the number of control units devices belonging to each of the control devices 1a~1n. The control device as a leading character will be referred to as "master device" and the control device as a subsidiary character, which follows the leading character, will be referred to as "slave device", hereinafter.

Figure 3:
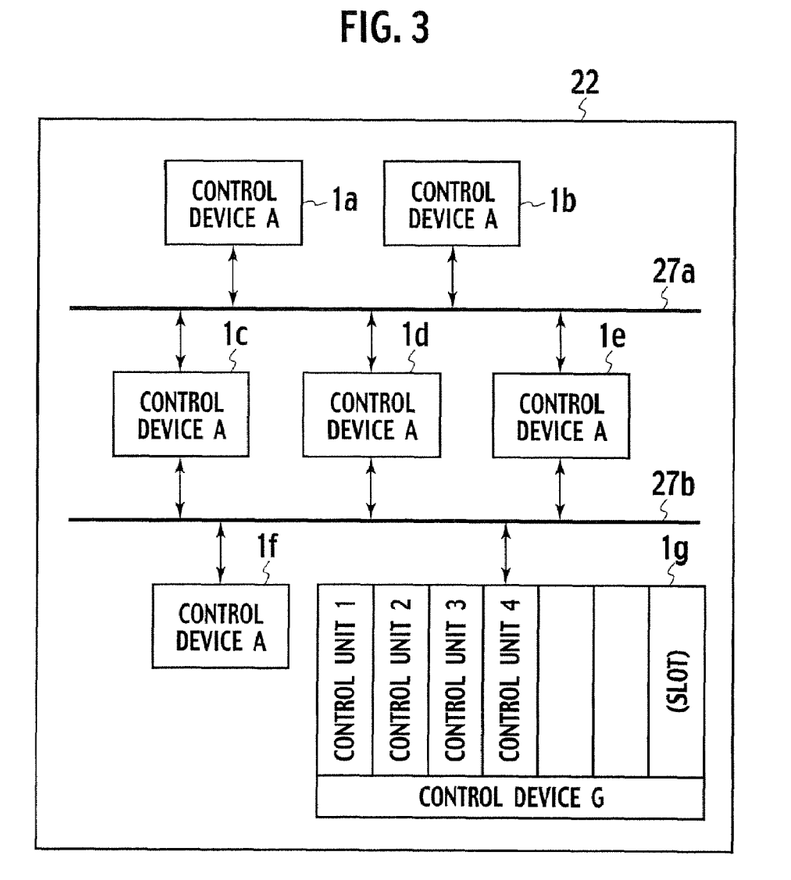
FIG. 3 is a view explaining one example of a control device system to which the managing method for information processor system in accordance with the embodiment of the present invention is applied.

FIG. 3 is a view showing one example of a control device system to which the managing method for information processor system in accordance with the embodiment of the present invention is applied. FIG. 3 shows a control device system 22 consisting of seven control devices 1a~1g.

The control devices 1a~1g are connected to each other through a plurality of networks 27a, 27b and are divided into some layers. In this example, the control devices 1a, 1b are positioned on a top layer, the control devices 1c, 1d, 1e are positioned on an intermediate layer, and the control devices 1f, 1g are positioned on a bottom layer. The control devices 1a~1g are provided with IDs characterized by the respective layers.

Each of the control devices 1a~1g is formed by a single unit having a plurality of slots. FIG. 3 illustrates that the control device 1g is composed of a plurality of slots. Each slot accommodates a single control unit 1. Additionally, each of the control devices 1a~1g may be provided with a multiplexed structure. If each of the control devices 1a~1d is provided with a double structure, there exist a primary system and a secondary system in the identical identification unit.

Figure 4:
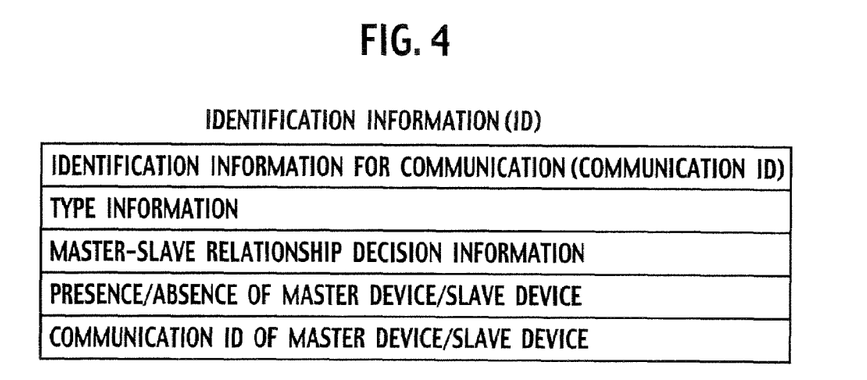
FIG. 4 is a view explaining the structure of ID stored in a data memory of an information processor in accordance with the embodiment of the present invention.

FIG. 4 is a view explaining the structure of the ID 26 stored in the data memory 13 in accordance with the embodiment of the present invention. As shown in FIG. 4, the ID 26 includes own identification information for communication (hereinafter called "Communication ID") for discriminating its own control device from the other control devices at communication, type information, master-slave relationship decision information, presence/absence of master device/slave device, and communication ID of master device/slave device.

Figure 5:
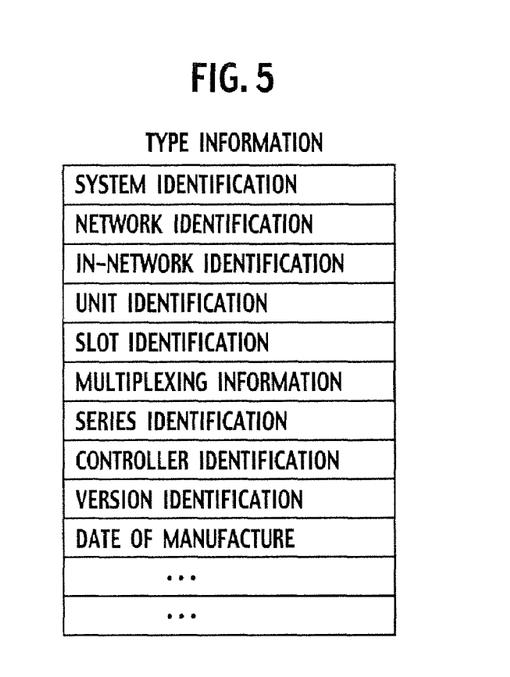
FIG. 5 is a detail view of the structure of type information forming the ID of FIG. 4.

FIG. 5 is a detail view showing the structure of the type information in the ID 26 of FIG. 4. As shown in FIG. 5, the type information includes system identification information, network identification information, and unit identification information. In addition, the type information further includes series identification information, controller identification information, version identification information, and so on. With the use of such information, it is possible to designate the name of type in detail.

A judgment, whether one control device can regard a mating device as the same type device at communication among the control devices 1a~1g, can be accomplished by determining which of various information the control devices 1a~1g do adopt. Consequently, if two control devices are of the same series of types, it is possible to classify these control devices into the same group. Alternatively, it is also possible to divide these control devices into smaller groups of devices dependent of the difference in version in spite of the same type. Thus, by stratifying the parameter (type information: second parameter) representing the type of control devices in the ID, the control devices 1a~1g are classified on the basis of the second parameter.

Figure 6:
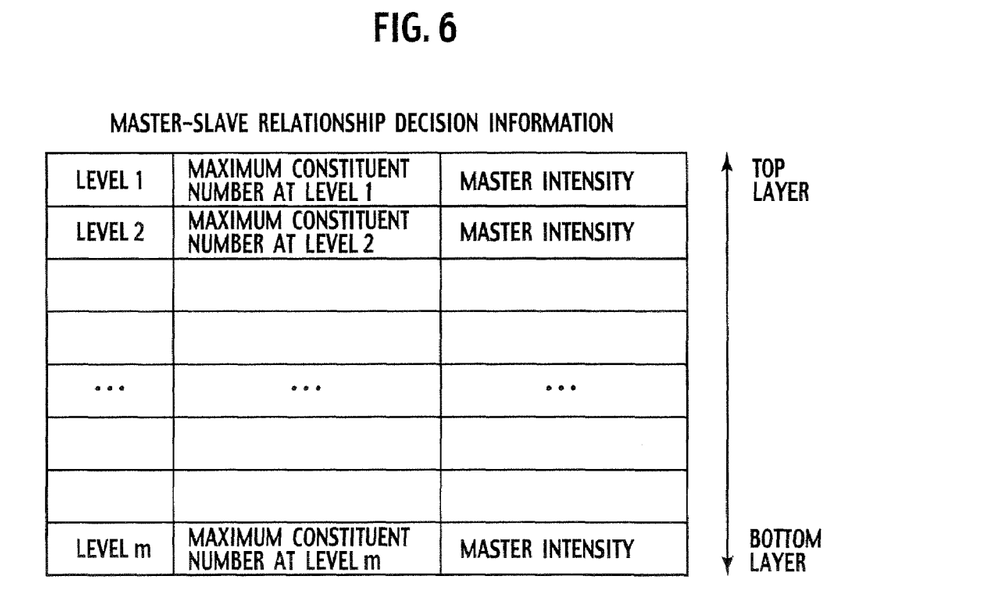
FIG. 6 is a detail view of the structure of master-slave relationship decision information forming the ID of FIG. 4.

Next, we describe a master-slave relationship decision among the control devices 1a~1n. FIG. 6 is a detail view showing the structure of the master-slave relationship decision information in the ID 26 of FIG. 4. With respect to each of the control devices 1a~1n, there is previously established a degree allowing its own control device to become a master device as the master-slave relationship decision information in the ID 26. Note below that this degree will be referred to as "master intensity". As the master intensity, a simple scalar value may be adopted, or the number of control units belonging to the own control device may be adopted. Further, as the master intensity, there may be adopted either a different parameter with respect to each level or one parameter throughout respective levels. Here, the "level" means a rank (hierarchy) in the master-slave relationship operation of the information processor system. In FIG. 6, the control devices 1a~1n are managed with "m" levels.

In addition, as the master-slave relationship decision information in the ID 26, a top level is previously established as a level for stopping the master-slave relationship operation. For instance, if a level "i" is established for the top level, then the maximum number of constituent devices at levels equal to or more than a level "i+1" is set up as 0 (zero). In such a case, if the sequential determination of the master-slave relationship exceeds the level "i" (top level), then the own control device stops its decision operation of the master-slave relationship.

Figure 7:
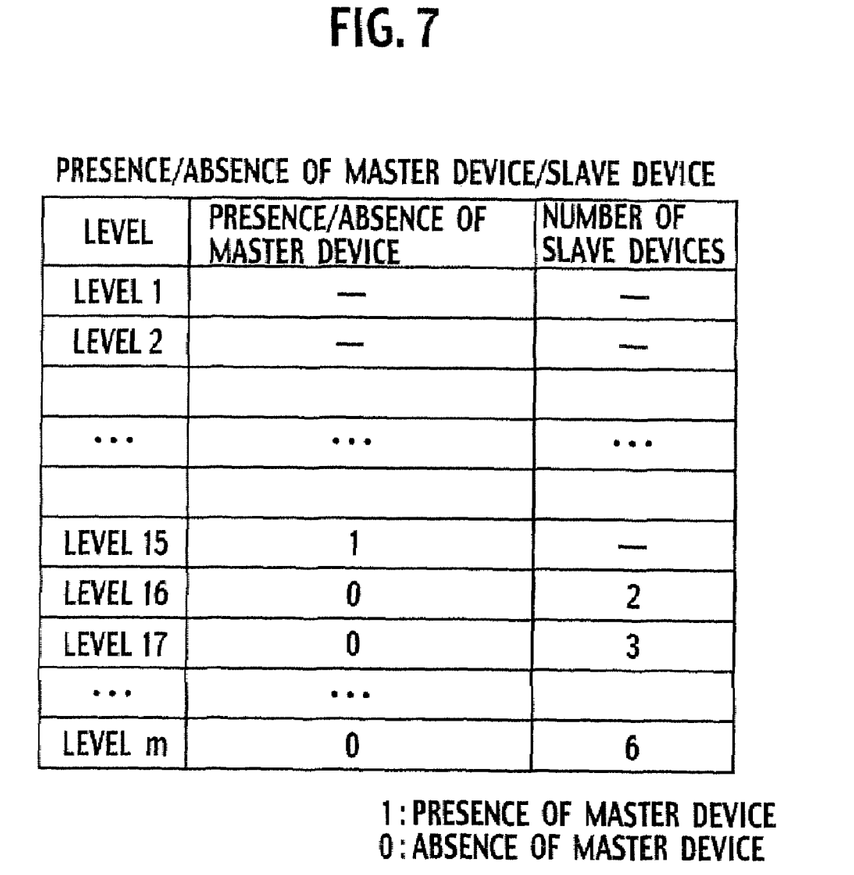
FIG. 7 is a detail view of the structure of "presence/absence of master device/slave device" forming the ID of FIG. 4.

FIG. 7 is a detail view explaining the information "presence/absence of master device/slave device" in the ID 26 of FIG. 4. In the presence/absence of master device/slave device in the ID 26, there are established both the presence/absence of the master device and the number of slave devices corresponding to respective levels "1" to "m". FIG. 7 shows one example where the master intensity allowing its own control device to become a master device is determined by the number of control devices belonging to the own control device. This example shows that this control device at level 15 becomes a slave device under one control device. Further, this example shows that this control device at levels equal to or less than 16 becomes a master device against other control devices. In detail, this control device has two slave devices at level 16, three slave devices at level 17, . . . , and six slave devices at level "m".

Figure 8:
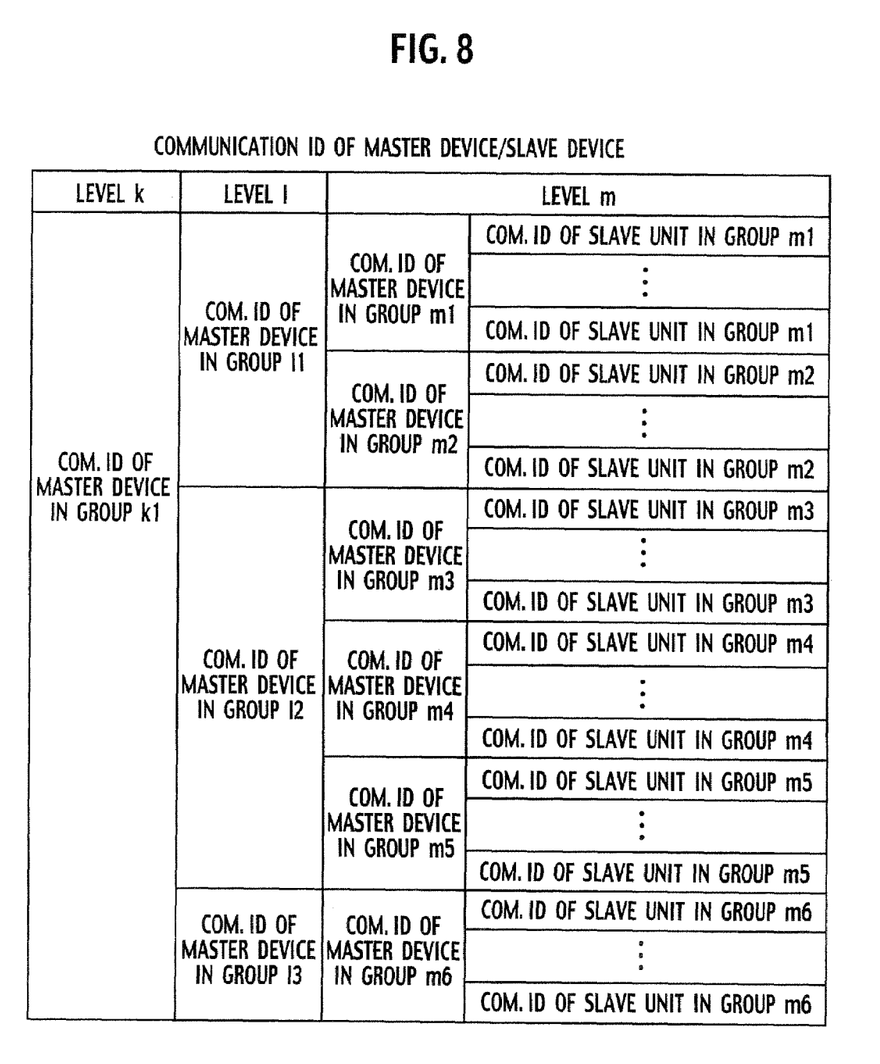
FIG. 8 is a detail view of the structure of "communication ID of master device/slave device" forming the ID of FIG. 4.

FIG. 8 is a detail view of the communication ID of master device/slave devices in the ID 26 of FIG. 4. In the communication ID of the master device/slave device in the ID 26, there are established communication IDs for the master devices and the slave devices in groups corresponding to levels 1 to n.

Next, in determining the master-slave relationship among the control devices 1a~1n, it is carried out to make a trade of the ID 26 of one control device for the ID 26 of another control device at a first communication therebetween. Then, with the use of the master-slave relationship decision algorithm 25 of each device, it is determined that which of the control devices becomes a master device.

Once one master device is determined, the master device stores the presence/absence of the master device and the number of slave devices into the information of the presence/absence of master device/slave device (FIG. 7) and further stores the communication ID of the slave device into the communication ID of the master device/slave device (FIG. 8). On the other hand, the slave device writes the information of master device's presence in the presence/absence of master device/slave device of the identification information area, as well. Additionally, the slave device stores the communication ID into the communication ID of master device/slave device.

If the own control device becomes neither a master device for any other control devices nor a slave device under any master device at present, it is carried out to decide the master-slave relationship among the control devices from a lowermost level. Whereas, if the own control device has already become a master device, it is carried out to decide the master-slave relationship at one step higher level than the level that the master device belongs to. Additionally, only when the present level of the own control device is lower than the top level of FIG. 6 and there is a room in the number of constituents at that level, the master-slave relationship is decided.

Now, it will be understood that the above description is directed to the master-slave relationship decision in correspondence with level. In the modification, a variety of methods may be adopted as the master-slave relationship decision algorithm 25. For instance, in case that a common parameter of two control devices take a same value, the master device may be determined with the use of random numbers.

In this way, it is firstly carried out to determine a master device among the plurality of control devices 1a~1n. Successively, it is carried out to lump control devices slaving to the master device together as one group. Subsequently, the other control devices (except for the group) could obtain the identification information of all control devices included in the group if only the other control devices are communicated with the master device.

The present invention may be modified in a manner that once one control device becomes a slave device, the control device would not update the master-slave relationship any more in spite of receiving a request for determining the master-slave relationship from another control device, but only responding a communication ID of the master control device and a fact that the own control device has already been a slave device.

Then, the control device requesting a decision of the master-slave relationship (referred to as "requesting device" below) ignores all control devices that have already been under the slave state. Further, the control device requests the master control device to decide the master-slave relationship newly, and then the master-slave relationship is determined between the master control device and the requesting device.

Subsequently, the master-slave relationship is further determined between a control device becoming a new master control device in this determination of the further head control device and a master control device of other group.

In this way, the track-back operation for the communication ID of the master device is repeated until arriving at the last master control device. Owing to this track-back operation, some groups of control devices are gathered into one group, allowing a formation of a large-scaled new group.

Figure 9:
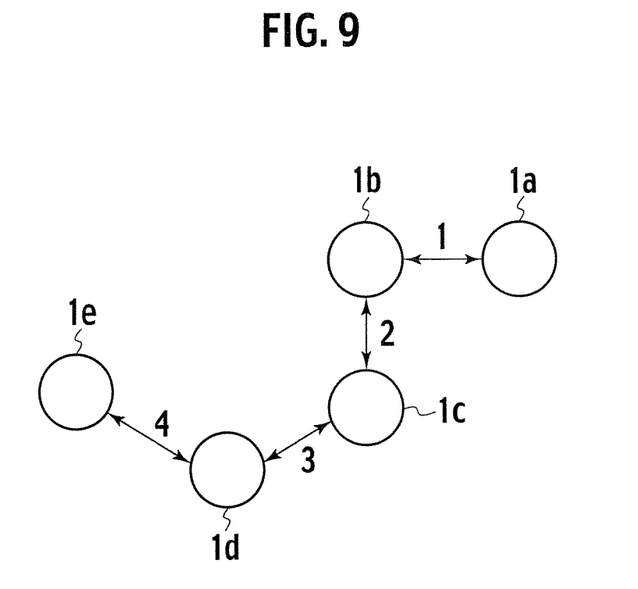
FIG. 9 is a view showing one example of procedures for establishing a master-slave relationship performed by the managing method for information processor system in accordance with the embodiment of the present invention.

FIG. 9 is a view showing one example of procedures for establishing the master-slave relationship of the embodiment of the present invention. Assume that there are five control devices 1a~1e each of which has an algorithm allowing the CPU 11 of the control device 1e to be a master device at last. In this case, the master-slave relationship is sequentially determined in order of the master-slave relationship decision operations shown by two-way arrows with reference numerals 1~4.

In detail, the master-slave relationship decision operation is firstly carried out between the control device 1a and the control device 1b, so that the latter device 1b becomes a master device while the former device 1a becomes a slave device. In succession, the control device 1b and the control device 1c carries out the master-slave relationship decision operation, so that the latter device 1c becomes a master device while the former device 1b becomes a slave device. Then, since the control device 1a is the slave device of the control device 1b, the same device 1a becomes another slave device of the control device 1c. Thereinafter, a master device is determined one by one in sequence, while the master device changes one after another. Finally, the control device 1e becomes a master device leading the other control devices 1a~1d as the slave devices and further registers this information as the identification information of the own control device 1e.

Figure 10:
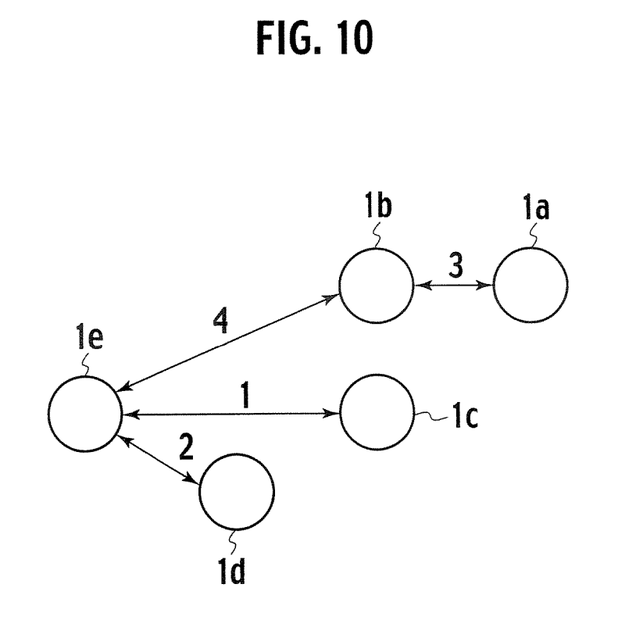
FIG. 10 is a view showing another example of the procedures for establishing the master-slave relationship performed by the managing method for information processor system in accordance with the embodiment of the present invention.

FIG. 10 is a view showing another example of procedures establishing the master-slave relationship of the embodiment of the present invention. In FIG. 10, at first, the control device 1e communicates with the control devices 1c, 1d and becomes their master device. In parallel with this operation, the control device 1a communicates with the control device 1b, so that it becomes a master device of the device 1a.

Under this condition, there remains one master-slave relationship decision operation between the control device 1e and the control device 1b. Thus, both of the devices 1e, 1b carry out an operation to determine their vassal relationship, so that the control device 1e becomes a master device leading the control device 1b as the slave device. Then, the control device 1b leading the control device 1a (as the slave device) passes it to the control device 1e, as its new slave device. Simultaneously, the control device 1b also becomes a slave device in itself. In this way, when the master-slave relationship is determined between two master devices, a resultant master device (i.e. a survival) inherits all of the slave devices that the remained master device (i.e. a new slave) possessed until that decision.

Next, we describe an operation to clear (free up) a group of control devices forming one established group up to now. That is, in order to rebuild the group of control devices, it is carried out to accommodate the whole control devices forming the group with a transmission command for wiping out the presence/absence information of the master device and the slave device. This transmission command is transmitted from a host computer, a monitor device or a control device identical to the master device.

When the control devices receive the transmission command generated from the host computer, the monitor device or the master device, each of the control devices clears the presence/absence information of the master device and the following information (about the communication ID) contained in the ID 26 of FIG. 4. In this way, it becomes possible to restructure a new master-slave relationship.

Additionally, according to the embodiment, it is also possible to prepare a transmission command for stabilizing the information about a group constructed once. If such a transmission command is issued, then one control device on receipt of the transmission command operates so as not to subsequently issue a request for determining the master-slave relationship any more. As a result, the once-established group of control devices can be stabilized. Thereafter, if only communicating with the master device in the group, then it is possible to manage the group of control devices as a whole.

Figure 11:
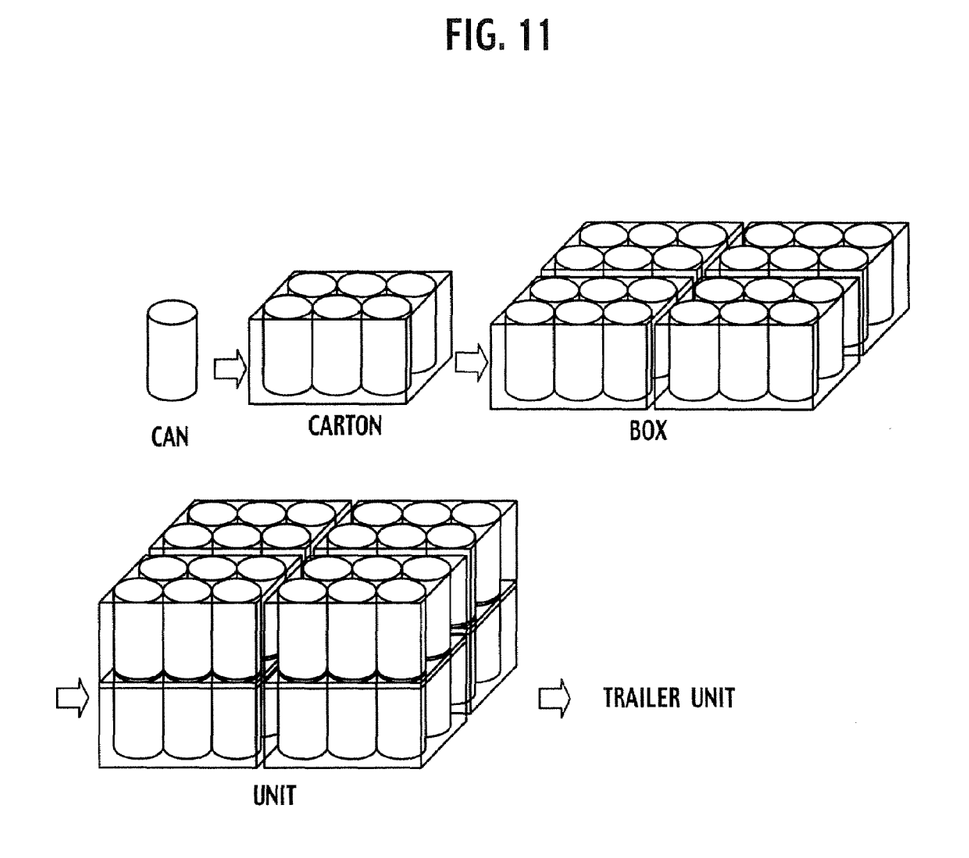
FIG. 11 is a view showing a case where the managing method for information processor system in accordance with the embodiment of the present invention is applied to RFID (wireless tags) attached on canned beers.

The above explanations stand on the assumption that the control device corresponds to the information processor of the invention. However, the present invention is not limited to this and therefore, for example, a wireless tag (RFID) may be assumed as the information processor. FIG. 11 is a view a case where the managing method for the information processor system of the embodiment of the present invention is applied to wireless tags (RFID) attached on canned beers.

Suppose, one wireless tag (RFID) applied on each beer-can contains information about the canned beer. Then, in accordance with the above-mentioned master-slave relationship decision method, it is carried out to collect e.g. six canned beers (i.e. one carton). Consequently, one wireless tag (RFID) as the master device becomes representative of group information as one carton of canned beers, allowing the monitor device or a counter for counting the number of canned beers to handle this group of beers as one carton of canned beers subsequently. Thereafter, for example, four cartons are gathered into one box and furthermore, four boxes are gathered to one unit. Still further, some units are gathered into one trailer-unit. In the above way, it is possible to apply the present invention to a group-management for canned beers.

We now explain details of the managing method for the information processor system of the embodiment of the present invention by an example of the group-management for canned beers. Suppose that there are provided forty-eight cans in all, referred to as C1~C48. They are positioned at level 4 (i.e. a level referred to as "can") and further gathered in increments of six cans to form a level 3 (i.e. a level referred to as "carton"). Consequently, with the production of eight cartons in total, we now call them by cartons K1~K8. Next, these cartons K1~K8 are gathered in increments of four cartons to form a level 2 (i.e. a level referred to as "box"). Consequently, with the production of two boxes in total, we now call them by boxes B1 and B2. Finally, these boxes B1, B2 are gathered into one to form a level 1 (i.e. a level referred to as "unit").

In this example, the level 1 is established as the top level. Additionally, numerical values for the above-mentioned naming of cans are adopted throughout all levels as the mater intensity. That is, the master intensity for a can Ci (i=1~48) is "i" throughout all levels. Then, it is established that an element having the largest numerical value in each level becomes a master. In this example, it will be understood that the can C48 continues to be a master all the way.

Figure 12A:
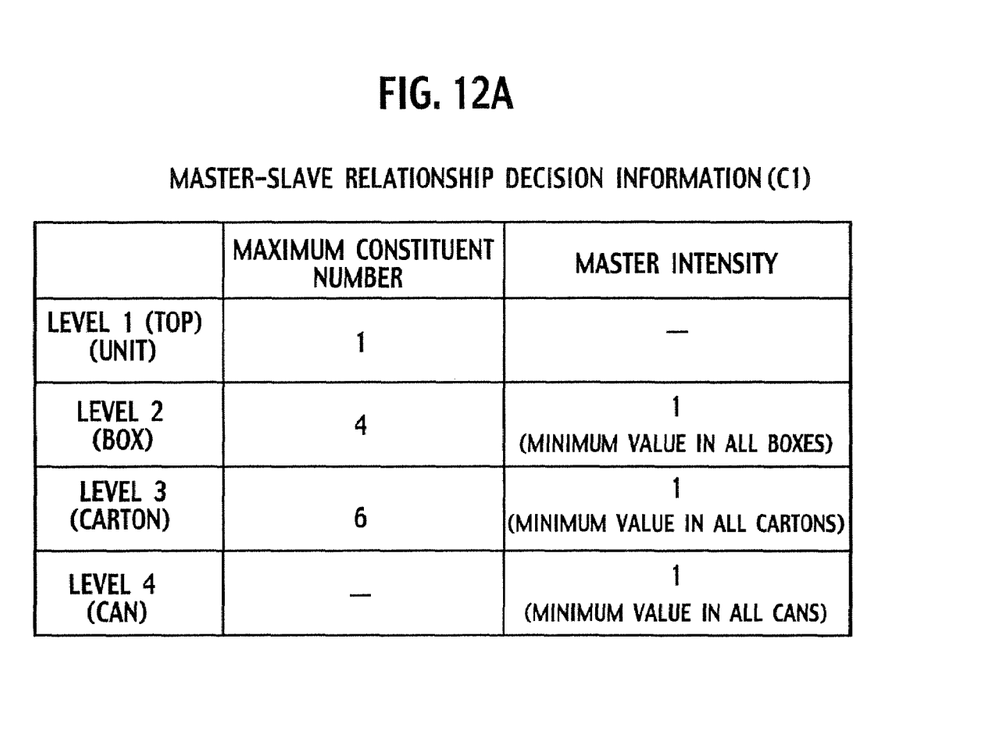
FIGS. 12A and 12B are detail views showing the structure of master-slave relationship decision information of cans C1 and C48, respectively.
Figure 12B:
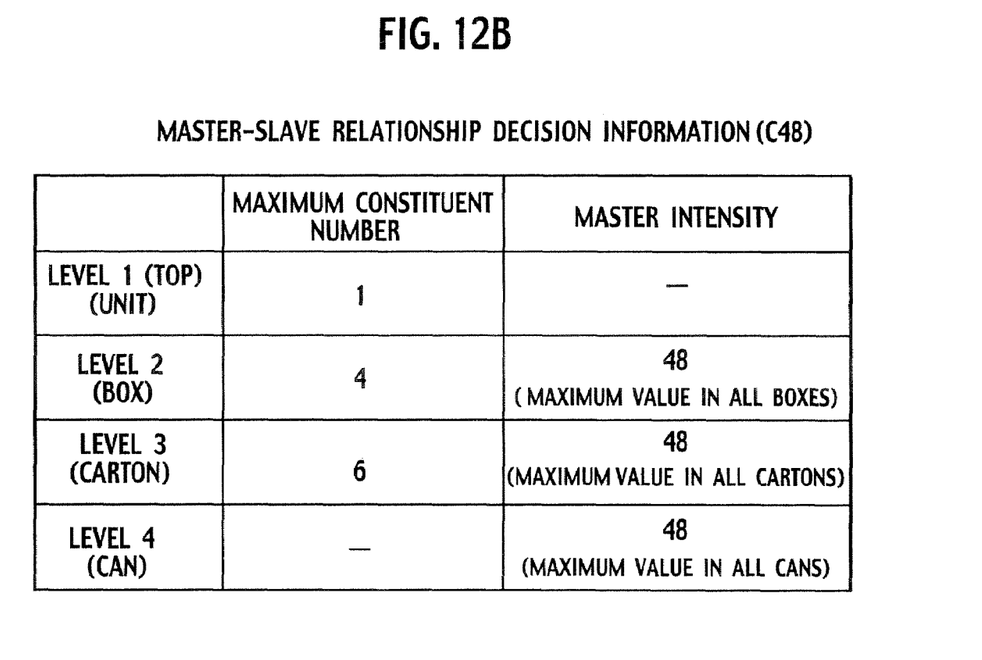

Then, for example, the master-slave relationship decision information about the cans C1 and C48 are established as shown in FIGS. 12A and 12B, respectively.

Figure 13:
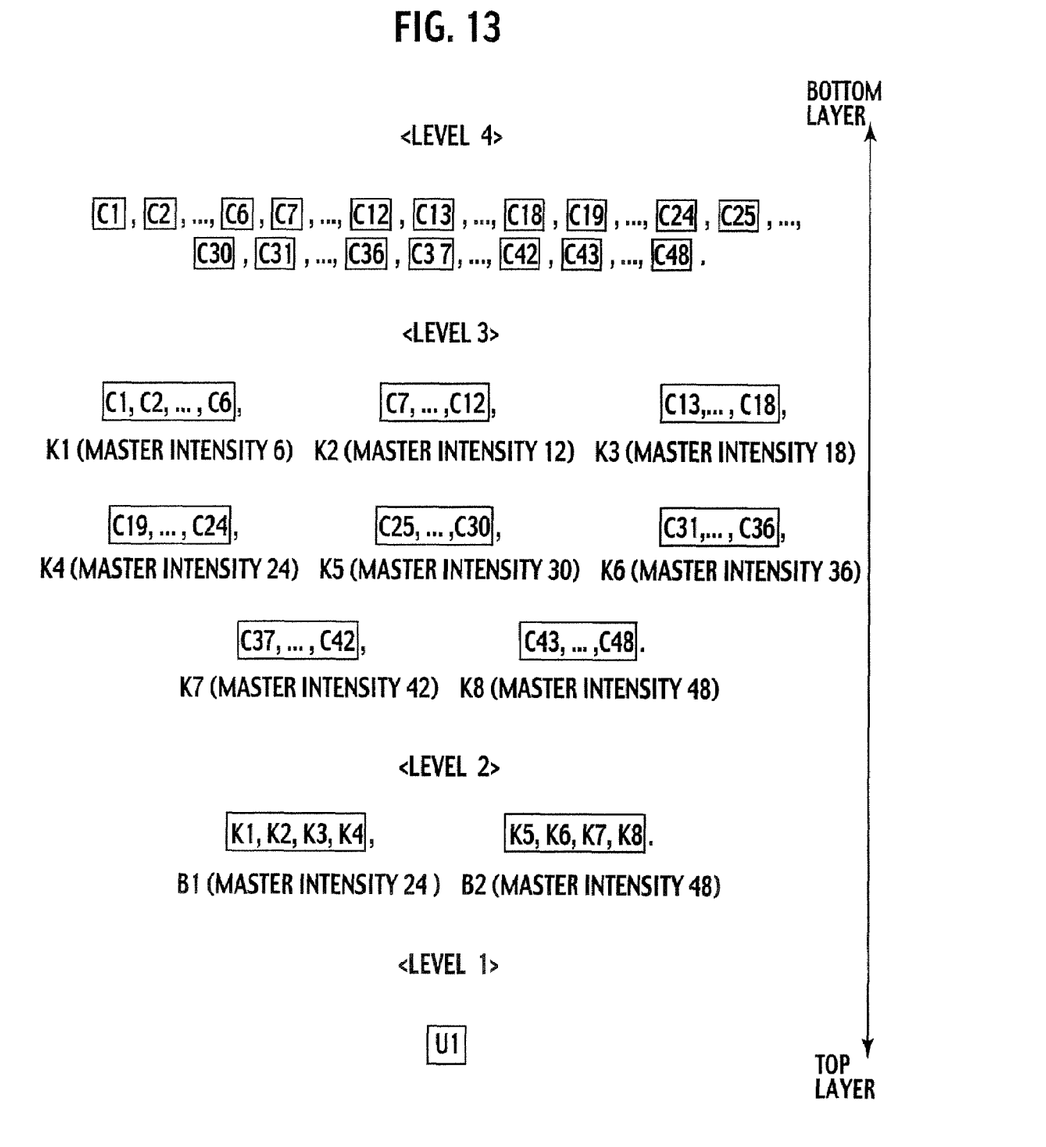
FIG. 13 is a diagram showing a hierarchization as a result of the master-slave relationship decisional operations for cans C1~C48.

Under such a situation, if the master-slave relationship decision operation is performed for the cans C1~C48 two by two in order from left, then a hierarchization is established as shown in FIG. 13.

According to the embodiment mentioned above, if only providing a logic allowing a determination of the master-slave relationship between one and the other (one-one relation) in order to determine the master-slave relationship among a plurality of information processors, then it becomes possible to manage an optional number of information processors collectively (in group). For the information processors collected in the form of a group, if only getting in communication with one information processor as the master device, it becomes possible to obtain all information of the group as a whole, facilitating handling of the plural information processors as one system.

In this way, according to the present invention, when communicating a plurality of information processors with each other, it is carried out to exchange the information processors' identification information containing the parameter for determining the master-slave relationship with each other and make a response of information processing on the basis of the so-exchanged identification information. In succession, by a simple method utilizing an algorithm to determine the master-slave relationship, the plural information processors are classified into groups. In conclusion, a higher information processor can grasp the whole truth of lower and grouped information processors with ease.

Finally, it will be understood by those skilled in the art that the foregoing descriptions are nothing but one embodiment and various applications of the disclosed managing method and therefore, various changes and modifications may be made within the scope of claims.

This application is based upon the Japanese Patent Application No. 2005-155805, filed on May 5, 2005, the entire content of which is incorporated by reference herein.

What is claimed is:

1. A managing method for an information processor system including a plurality of information processors, comprising:
   providing each of the plurality of information processors with identification information and an algorithm for determining a master-slave relationship among the plurality of information processors;
   controlling two of the plurality of information processors to exchange their identification information when the two information processors communicate with each other;
   determining a first master-slave relationship between the two information processors based on the algorithm using the exchanged identification information;
   grouping the two information processors into a group;
   determining a second master-slave relationship between the master information processor and a second information processor that does not belong to the group, based on the algorithm and their identification information, respectively, when the master information processor of the group communicates with the second information processor, wherein
   the identification information includes a first parameter for identifying each of the plurality of information processors when the plurality of information processors communicate with each other, a second parameter representing a rank of each of the plurality of information processors, an information representing the presence/absence of the master information processor, an identification information of the master information processor, an information representing the presence/absence of a slave information processor, and an identification information of the slave information processor.

2. The managing method of claim 1, further comprising:
   classifying the plurality of information processors into ranks designated by the second parameter.

3. The managing method of claim 1, further comprising:
   controlling the slave information processor to stop determining the second master-slave relationship among other of the plurality of information processors when one of the plurality of information processors is determined as slave information processor.

4. The managing method of claim 1, further comprising:
   controlling the slave information processor only to reply to readout of information representing its own slavery state and the identification information of the master information processor for the slave information processor when one of the plurality of information processors is determined as slave information processor.

5. The managing method of claim 1, further comprising:
   when the first master information processor of a first group communicates with a slave information processor of a second group, controlling the first master information processor to acquire the identification information of the second master information processor of the second group, and
   determining a master-slave relationship between the first master information processor and the second master information processor based on the algorithm using the acquired identification information.

6. The managing method of claim 1, further comprising:
   outputting a transmission command to clear the second master-slave relationship to information processors that belong to a group; and
   breaking off the master-slave relationship previously determined about the information processors of the group on receipt of the transmission command.

7. An information processor system comprising:
   a plurality of information processors connected with each other through a transmission line, each of said information processors including
   a memory configured to store identification information and an algorithm for determining a master-slave relationship among the plurality of information processors to group said information processors into a plurality of groups,
   an interface through which the information processor communicates with a second information processor of said information processors to exchange identification information with the second information processor, and
   a circuit configured to determine the master-slave relationship in a group with the second information processor based on the algorithm using the exchanged identification information, wherein
   the identification information includes a first parameter for identifying each of the plurality of information processors when the plurality of information processors communicate with each other, a second parameter representing a rank of each of the plurality of information processors, an information representing the presence/absence of a master information processor, an identification information of the master information processor, an information representing the presence/absence of a slave information processor, and an identification information of the slave information processor.

* * * * *